Oct. 7, 1924.
A. J. KLONECK
1,510,624
ELECTRICAL POWER TRANSMISSION BY RADIATION
Filed March 31, 1920
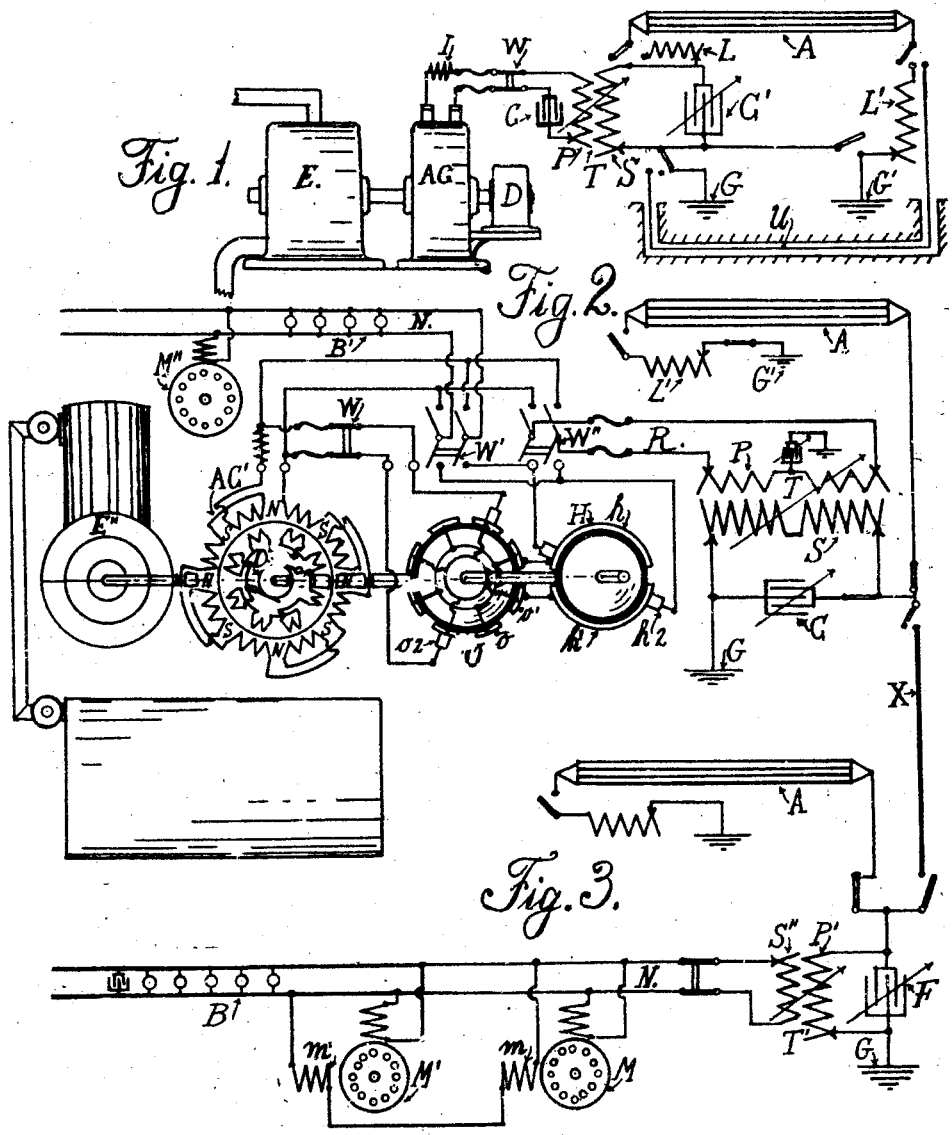
WITNESSES.
INVENTOR.
August J. Kloneck.

Patented Oct. 7, 1924.

1,510,624

UNITED STATES PATENT OFFICE.

AUGUST J. KLONECK, OF NEW YORK, N. Y.

ELECTRICAL POWER TRANSMISSION BY RADIATION.

Application filed March 31, 1920. Serial No. 370,255.

*To all whom it may concern:*

Be it known that I, AUGUST J. KLONECK, a citizen of the United States, and a resident of New York city, in the county of New York and State of New York, have invented certain new and useful Improvements in Electrical Power Transmission by Radiation, of which the following is a specification.

This invention relates to systems of transmitting electrical energy through space without wires for the purposes of driving machinery at distant points from one or more central power stations.

It is well known that electrical energy is at present propagated through space for signaling purposes utilizing frequencies of 10,000 to 1,500,000. As the electrical energy is assumed to travel 300,000,000 meters a second the above frequencies would produce wave lengths of 30,000 to 200 meters.

In contrary to such high frequencies and short wave lengths I employ frequencies of practical working cycles a second that is frequencies of 15 to 200 cycles a second, such frequencies are commonly employed at central stations as working current.

Deducting from the above, I for instance employ a current character of 60 cycles a second which would correspond with a wave length of 5,000,000 meters. Since the inductance capacity constant is $$59{,}6\sqrt{LC}$$

in meters, wherein inductance L is expressed in 0.000,000,001 henries and capacity C in microfarads, the constant corresponding to 60 cycles would be 7 henry-microfarads (7 henries-1 microfarad) or any equivalent as for instance 700 henries and 0.01 microfarads. Thus, it is necessary that the inductance and capacity for 60 cycles be 7 henry-microfarads in the radiation circuits to be able of transmitting electrical energy at such utilizing frequencies. It is evident that in the transmitting and receiving circuits the same constant will be employed for the same frequency of transmitting and receiving apparatus.

Referring more particularly to the drawing, Figure 1 denotes a transmitting station. Figure 2 shows another transmitting station cooperating therewith. Figure 3 shows a receiving station adapted to be operated.

In Figure 1 E denotes a water turbine which operates an alternating current generator AC and an exciting direct current dynamo D. T designates a transformer having its primary P connected through a tuning condenser C to the terminals of the generator AC. A secondary S of transformer T is connected by an inductance L and condenser C' to an antenna A and ground G. The antenna A is shown comprising at the opposing end an underground antenna U. In circuit with the alternating current generator AC is further a switch W and impedances I.

In Figure 2, E'' designates an engine which drives the alternating current generator AC'. The circuits and elements correspond with those of Figure 1. Both stations consisting of Figure 1 and Figure 2 are adapted to cooperate with one another. The cooperation of the dynamos in Figures 1 and 2 will automatically be regulated by each other in a manner whereby if one dynamo would turn too slow the same will be operated as a motor by the dynamo of the other station but the engine driving power of the dynamos will cause proportional generations of current of both dynamos in synchronism.

In Figure 3 which shows a receiving station, A denotes an antenna connected to the primary P' of a transformer T' and further to ground at G. Inductances and condenser F may be included to tune the circuits to the desired frequency. A step down secondary S'' of transformer T is connected with two motors M and M' and a lighting circuit B. The motors may be started as desired, in the figure each motor is assumed to have self starting coils $m$ in series with one another to produce a lagging phase of alternating current within said motors.

It will be obvious that several receiving stations may be operated from one aerial and that a transmitting station as Figure 2 may be connected by an aerial wire X with receiving stations as with Figure 3 where the increased efficiency permits such use. The wave character of such transmitting station will be retained thereby and other receiving stations may simultaneously be operated therefrom by wireless transmission of power.

Sometimes it is necessary to have a local power circuit operated from one transmitting station with alternating currents of a lower frequency than the current to be radiated, or vice versa. In Fig. 2, for instance, is shown an alternator AC supposedly operating a local circuit at a frequency of 15 to 60 cycles a second while by means of commutators O and H the frequency of the alternator is reduced from 60 to 15 cycles a second. Commutator O has 8 bars $o$ and $o'$ alternately connected with one of a half ring commutator $h'$ and $h$. The latter have brushes $h^2$ while commutator O has brushes $o^2$. The arrangement shown is assumed to be synchronously driven with an 8 pole alternating current generator AC.

Having now fully described my invention that what I claim as new and desire to secure by Letters Patent is:—

1. A system for transmitting electrical power at a frequency below 200 cycles a second, comprising alternating current generators of the desired phase and frequency, means for energizing said alternating current generators and mechanical driving means for the same, of transformers having their primaries suitably connected with said alternating current generators, a radio conductor system connected with the secondaries of said transformers comprising a ground conductor, and suitable reactance elements connected in series with said secondaries adapted for modifying and tuning said secondary circuit, a receiving circuit comprising a radio conductor system connected with transformers and suitable reactance elements, the latter being adapted for tuning the receiving circuit in resonance with said transmitting circuit, and utilizing means including motors and lights connected with said transformers.

2. A system for transmitting electrical power at a frequency below 120 cycles a second comprising alternators of the desired phase and frequency, a source of power for driving said alternators, means for energizing the same, a radio conductor system and suitable reactance elements arranged between said alternator and said conductor system adapted for modifying a current flow from said alternators to said conductor system.

3. A system for transmitting electrical power and means for utilizing said power at local and remote points at different frequencies comprising alternators of a certain frequency and means for operating the same, a radio conductor system and a local circuit operated by said alternators, means for changing the frequency of current from said alternators to a lower frequency and below 120 cycles a second, and means for operating said local circuit and said radio conductor system at one or both of said two current frequencies, and suitable reactance elements arranged between said radio conductor system and one of said means for producing an alternating current of one frequency.

4. A system for transmitting and receiving light and motor power, comprising a plurality of independently operating generating dynamos arranged at remote points from one another and adapted for cooperatively radiating electrical energy of one character and of a frequency below 200 cycles, and independent radiating circuits for said dynamos, and means for tuning each of said radiating circuits to a corresponding frequency.

5. A system for transmitting electrical light and motor power to a local circuit and by means of a radiating circuit, to remote power utilizing stations, comprising a dynamo set, adapted for generating alternating current of a certain frequency, a commutator adapted for reducing said generated current to a current of another and lower frequency and comprising two commutator parts with a relative number of bars corresponding to the two different frequencies of said alternating currents, and means for connecting said commutator parts with one another and with said dynamo and circuits, substantially as set forth.

In testimony whereof I hereunto sign my name to this specification in the presence of two witnesses, this 7th day of July, 1919.

AUGUST J. KLONECK.

Witnesses:
JULIUS BRUNNING,
FRED MAURIKEY.